July 17, 1923.  
J. W. CORSER  
PISTON  
Filed May 16, 1921
1,462,084
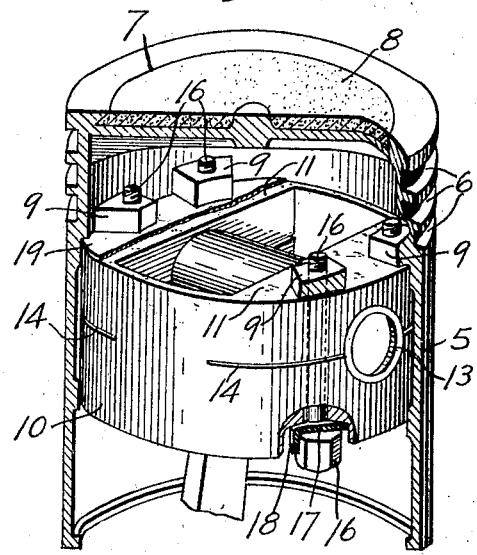
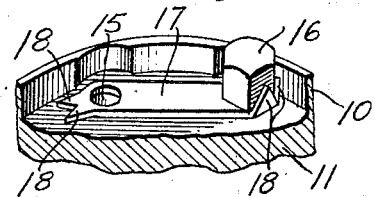
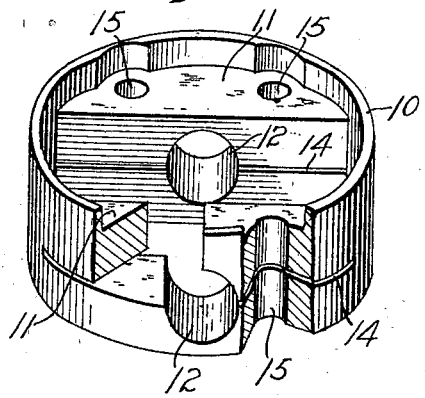
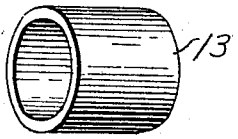
INVENTOR.
John W. Corser
BY Westall and Wallace
ATTORNEYS.

Patented July 17, 1923.

1,462,084

UNITED STATES PATENT OFFICE.

JOHN W. CORSER, OF LOS ANGELES, CALIFORNIA.

PISTON.

Application filed May 16, 1921. Serial No. 470,148.

*To all whom it may concern:*

Be it known that I, JOHN W. CORSER, a citizen of the United States, and resident of Los Angeles, in the county of Los Angeles, State of California, have invented new and useful Improvements in a Piston, of which the following is a specification.

This invention relates to a piston construction for internal combustion engines, and is particularly adapted for engines having lubricant below the piston so that it comes in contact therewith.

It is an object of this invention to provide a piston having a head of such character that heat is not readily conducted through the head, and to this end the head is heat insulated. Another object of this invention is to provide a removable wrist pin bearing ring which does not require the shell of the piston to be bored through and permits the use of removable bushings. In addition to the broader objects of this invention, there are certain details of design whereby a light weight high speed piston of durable and simple construction is secured.

These objects together with other objects and corresponding accomplishments are obtained by means of the embodiment of my invention illustrated in the accompanying drawing, in which:

Fig. 1 is a perspective view partly in section showing the piston parts assembled; Fig. 2 is a perspective view of the wrist pin ring with fragments broken out and shown in section; Fig. 3 is a perspective view of a fragment of the wrist pin ring showing a novel lock for holding the bolts against turning; and Fig. 4 is a perspective view of the bushings used with my wrist pin ring.

Referring more particularly to the drawing and especially to Fig. 1, the skirt of the piston 5 is shown provided at the end adjacent the head with the usual grooves 6 to receive piston rings. The skirt has no openings therethrough. The head is formed with a circular recess 7, undercut at the periphery. Disposed in the recess is a heat insulating composition 8. Such compositions are well known in the mechanical arts, and it is convenient to use a plastic composition which eventually sets. Formed on the internal wall of the piston skirt are lugs 9, which are bored and threaded to receive bolts.

The wrist pin ring may be of a light weight metal such as aluminum. It consists of a cylindrical hollow body portion 10. Segments for bearings indicated by 11 extend across the wrist pin ring and are provided with aligned openings 12 to receive bushings 13. These bushings are preferably of bronze. The bearing segments and ring body are slit transverse the axis of the cylinder as indicated by 14 to provide for clamping the bushings in place and are provided with bolt holes 15 which may be registered with the bolt holes in the lugs 9. Bolts 16 are placed therein to secure the wrist pin ring to the lugs and in position on the piston body. In order to lock the bolts against turning, I have provided a strip of sheet metal 17 having openings for the bolts to extend therethrough and provided with spurs 18. The spurs may be turned up against the head of the bolts as indicated in Fig. 3, locking the latter against turning. In order to enclose the top of the piston above the wrist pin ring I have provided a disk 19. This forms an air chamber further insulating the top or the head of the piston from the lubricant below.

It is obvious that the piston will not be deformed by reason of the strain of the wrist pin, as would be the case where the skirt of the piston is bored through. The bolts 16 act to hold the wrist pin ring in place and at the same time to lock the bushings in position. It is obvious that as the bushings become worn, the wrist pin ring may be removed and new ones inserted. Any lubricant which comes in contact with the top of the piston, where the disk is not used, or in contact with the disk will not be heated to the point that carbonization occurs. With engines of this character, in which no provision is made to prevent burning of the lubricant, the latter is carbonized, breaking down the lubricant and causing a serious decrease in efficiency. The assembling and disassembling of the piston is easily effected, requiring a minimum of skill.

What I claim is:

1. A piston comprising an imperforate skirt and a head, a wrist pin ring having aligned bushing openings and slits extending peripherally across said openings to allow for contracting them, said skirt having inner supporting means for attachment thereto of said ring, a disk interposed between said ring and said supporting means, bushings in said openings, and bolts extending through said ring and secured to said supporting means whereby to attach said ring to said supporting means and contract said openings for locking the bushings in place.

2. A piston comprising an imperforate skirt and a head, a wrist pin ring having aligned bushing openings and slits extending peripherally across said openings to allow for contracting them, said skirt having inner supporting means for attachment thereto of said ring, bushings in said openings, and bolts extending through said ring and secured to said supporting means, whereby to attach said rings to said supporting means and contract said openings for locking the bushings in place.

3. A piston comprising an imperforate skirt and a head, a wrist pin ring having aligned bearing openings, said skirt having inner supporting means for attachment thereto of said ring, and a disk interposed between said ring and said supporting means to form a closed space in said head.

In witness that I claim the foregoing I have hereunto subscribed my name this 5th day of May, 1921.

JOHN W. CORSER.